United States Patent [19]

Armbruster

[11] Patent Number: 5,165,133
[45] Date of Patent: Nov. 24, 1992

[54] SOCKET CLEANER

[76] Inventor: Franz O. Armbruster, 18599 E. Louisiana Ave., Aurora, Colo. 80017

[21] Appl. No.: 808,430

[22] Filed: Dec. 16, 1991

[51] Int. Cl.$^5$ .................................................. B08B 9/00
[52] U.S. Cl. ..................................... 15/97.1; 15/22.1; 15/210.1; 15/245
[58] Field of Search ................... 15/97.1, 245, 210 R, 15/230.16, 104.1, 22.1, 23; 128/56, 62 R, 62 A

[56] References Cited

U.S. PATENT DOCUMENTS

| | | | |
|---|---|---|---|
| 1,251,775 | 1/1918 | Gysler | 15/250.22 |
| 1,370,256 | 3/1921 | Adams | 15/230.16 |
| 2,910,713 | 11/1991 | Row | 15/210 R |
| 4,468,834 | 9/1984 | David | 15/97.1 |

Primary Examiner—Edward L. Roberts
Attorney, Agent, or Firm—Brian D. Smith

[57] ABSTRACT

A socket cleaning tool having a rotatable mandrel and a hollow elastomeric sleeve which seats on the mandrel is disclosed. The outer surface of the sleeve defines a plurality of wiper strips which extend substantially the length of the sleeve and which terminate at edges that are sized and shaped to contact and wipe the surface of a socket as the sleeve and mandrel are rotated in the socket to clean the socket.

15 Claims, 1 Drawing Sheet

SOCKET CLEANER

TECHNICAL FIELD

The invention relates generally to improvements in socket cleaners and, more particularly, to a socket cleaning tool which is easily and economically manufactured and maintained.

BACKGROUND OF THE INVENTION

U.S. Pat. No. 2,910,713 to Row discloses a socket cleaning tool having a plurality of slots for receiving a plurality of elongated wiper strips which, when received in the slots, project laterally from the tool. While this tool will undoubtedly clean sockets as illustrated in the Row patent, when the wiper strips wear out, each strip has to be individually replaced. The surface of the tool from which the wiper strips project also has to be cleaned every time it is necessary to replace the wiper strips. The process of individually replacing each strip and cleaning the tool's surface is, quite obviously, a time-consuming task. Additionally, machining the slots in the blade holder makes the Row tool expensive to manufacture, as the slots are helically cut into a frusto conical surface. Accordingly, it would be desirable if a socket cleaning tool were available that would simplify the process of replacing the blades and, if possible, do away with the need for having to clean the surface of the tool from which the wiper blades extend, and be inexpensive to manufacture.

It would also be desirable if the wiper strip containing portion of the tool were rotatable. A tool having a rotating cleaning portion would make it easier to clean a socket. It would also enable automated use of the tool, i.e. by an automated or robotic tool changing mechanism.

A desirable socket cleaning tool would also preferably include internal or self-contained power means for rotating that portion of the tool containing the wiper blades. A self-contained power means would also make it possible to make the tool entirely cordless which would be particularly desirable if the tool is to be operated or held by an automated or robotic tool gripping mechanism. Quite obviously, cords hanging from such a tool could interfere with the operation of a robotic tool gripping mechanism.

A desirable socket cleaning tool would also preferably have means for facilitating holding of the tool in the socket to be cleaned by the tool. In addition, the tool would preferably include pressure adjusting means for adjusting the squeegee pressure of the tool's wiper strips against the surface of the socket. Such a pressure adjusting means would further enhance the tool's cleaning capability.

DISCLOSURE OF THE INVENTION

The present invention fulfills the aforementioned needs by providing a socket cleaning tool having a mandrel and a generally hollow elastomeric sleeve for seating on the mandrel. The sleeve defines an inner surface for seatingly receiving the mandrel and an outer surface defining a plurality of elongate wiper strips which extend substantially the length of the sleeve and which terminate at edges that are sized and shaped to contact and wipe the surface of a socket as the sleeve and mandrel are rotated in the socket, thereby cleaning the socket. The mandrel is preferably rotatively attached to one end of the tool for rotation about the tool's longitudinal axis. The tool further includes self-contained power means for rotatively driving the mandrel.

In a preferred embodiment specifically designed for use with an automated or robotic tool changing mechanism, the tool includes a retention knob assembly which is axially aligned with the tool's longitudinal axis and which projects outwardly from the mandrel. The knob assembly has a knob at its free end for receipt in a conventional retention device which holds the tool in place in a socket to be cleaned by the tool. The retention knob assembly further includes adjustable spring means for adjusting the squeegee pressure of the tool's wiper strips against the surface of a socket to be cleaned with the tool.

The embodiment designed for use with an automated or robotic tool changing mechanism also preferably includes grip facilitating means for receiving the gripping elements of an automated tool changing mechanism. In a preferred embodiment, the grip facilitating means includes a disc shaped flange member which projects laterally from the tool. In addition, the disc-shaped flange member is coaxially aligned about the longitudinal axis of the and further defines a V-shaped groove about its periphery for receiving the gripping elements of an automated tool changing mechanism.

The invention which reads as follows:

Additional advantages this invention will become apparent from the description which follows, taken in conjunction with the accompanying drawings.

BEST MODE FOR CARRYING OUT THE INVENTION

Figure 1:
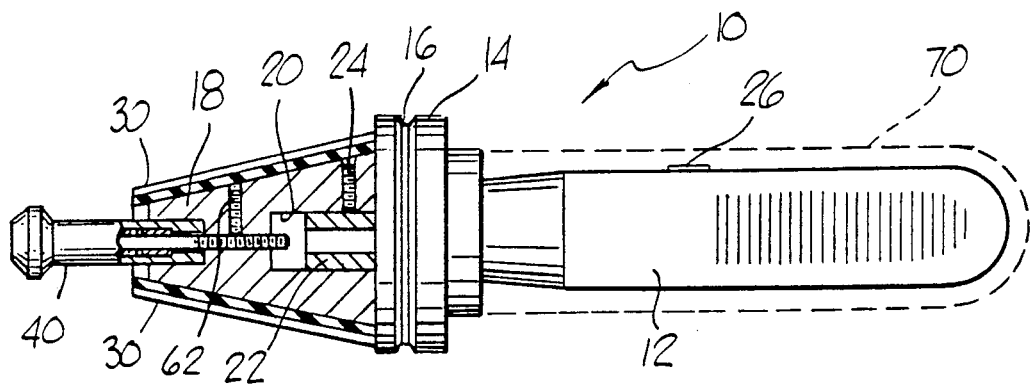
FIG. 1 is a side plan View of a socket cleaning tool of the present invention, a portion of which is broken away showing the mandrel of the tool in cross section.

FIGS. 1 through 4 illustrate a socket cleaning tool 10 of the present invention which may be gripped manually by an individual with his hand or by the gripping elements of an automated or robotic tool changing mechanism. To grip the tool by hand, a handle 12 located at one end of the tool is provided. To grip with a robot or other automated device, tool 10 is provided with a disc-shaped flange member 14 defining a V-shaped groove 16 about its periphery which receives the gripping elements of an automated or robotic tool-changing mechanism. As illustrated, flange member 14 extends from a central portion of the tool (adjacent to the inner end of handle 12) and is coaxially aligned therewith.

Tool 10 also includes a frustoconically-shaped mandrel 18 which is located at the end of the tool opposite handle 12. Mandrel 18 has a cylindrically-shaped chamber 20 for receiving the tool's drive shaft 22 which is rotated, i.e. rotatively driven by a rechargeable battery powered DC motor (not shown) located in handle 12.

The rechargeable battery powered DC motor is similar to that used in conventional cordless screw drivers.

Returning to FIG. 1, it can be seen that mandrel 18 is secured to shaft 22 by a set screw 24 which is threadably received in a bore (not numbered) provided in mandrel 18. Screw 24 rigidly secures the mandrel to drive shaft 22 when it is tightened. Thus, it will be appreciated that mandrel 12 rotates when shaft 22 is rotated by activating the DC motor contained in handle 12. The DC motor can be activated by flipping a switch such as switch 26 illustrated in FIG. 1. The motor could also be activated by a mercury gravity switch which would activate the DC motor when the tool is oriented in a pre-determined position which causes the electrical contacts of the switch to be connected by mercury, in a manner well known to those skilled in the art.

Figure 2:
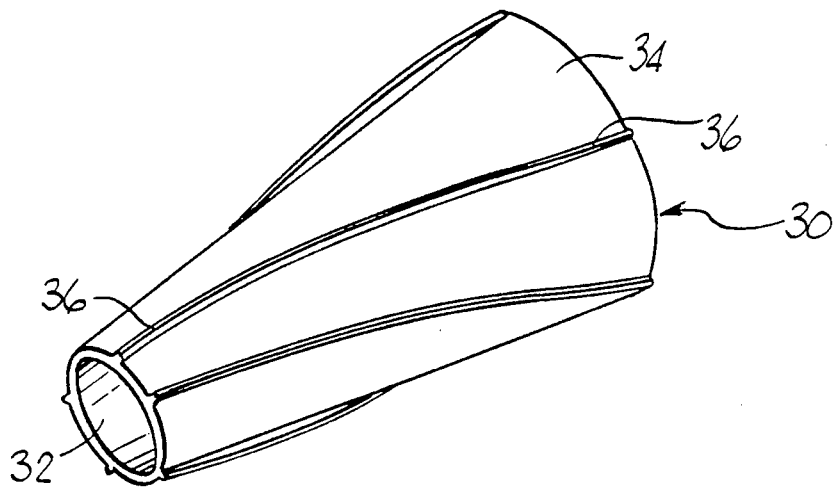
FIG. 2 is a perspective view showing in isolation the sleeve which is seated on the mandrel of the tool illustrated in FIG. 1.
Figures 3, 4:
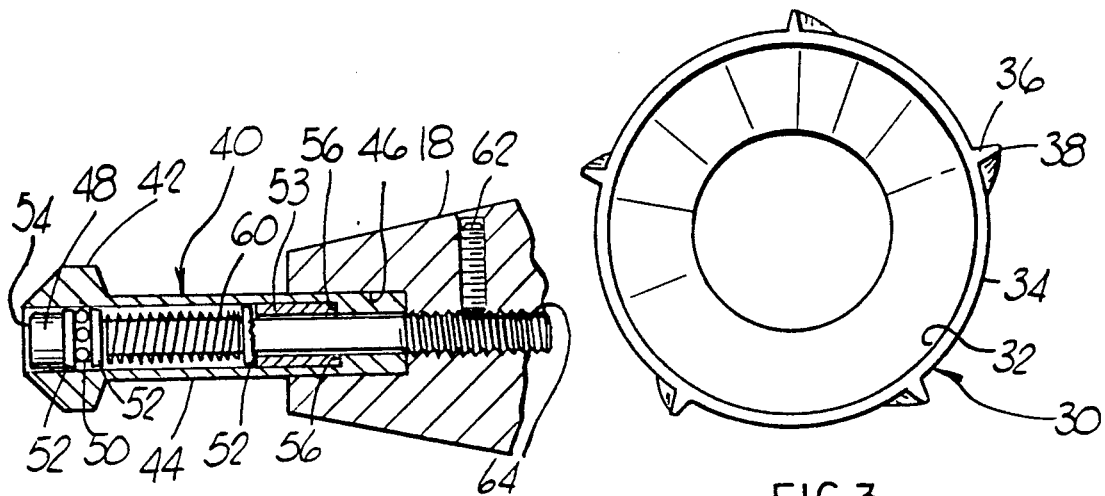
FIG. 3 is an end elevational view of the sleeve of FIG. 2 showing the inner-surface of the sleeve which seats on the mandrel of the tool of FIG. 1.
FIG. 4 is a partial view of the tool of FIG. 1 showing the retention knob assembly and small end of the mandrel in cross section.

In accordance with another important aspect of the present invention, tool 10 also includes a hollow (preferably frustoconically-shaped) elastomeric sleeve 30 for seating on mandrel 18. Sleeve 30 has an inner surface 32 for seatingly receiving the mandrel and an outer surface 34 which defines a plurality of elongate wiper strips 36. As best illustrated in FIGS. 2 and 3, wiper strips 36 are integral with the sleeve and extend substantially the length of the sleeve. In addition, strips 36 terminate at edges 38 that are sized and shaped to contact and wipe the surface of the socket as the sleeve is rotated in the socket. As illustrated, sleeve 30 has five wiper strips 36 which extend about the sleeve in a helical fashion. The use of five wiper strips in helical fashion has been found to provide exceptionally good cleaning action. Those skilled in the art will appreciate that when the tool is located in a socket and turned on, the mandrel and sleeve rotate, i.e. together in unison, to clean debris often called "swarf" out of the socket. The swarf is cleaned from the bottom and the sides of the socket and collects on the wiper strips. The swarf is easily removed from sleeve surface 34 and the wiper strips of the sleeve by simply wiping along the edges of the blades 36 with an absorbent cloth or paper shop wipe.

As those skilled in the art will appreciate, to properly and effectively clean sockets with tool 10, it is important that sleeve 30 rotate in unison with mandrel 18 (i.e. not slip) as mandrel 18 is rotated. Accordingly, it is important that sleeve 30 be secured to mandrel 18 in some manner. In the preferred embodiment, sleeve 30 is made out of an elastic material such as rubber having a hardness from about 70 durometers on the A scale to about 40 durometers on the D scale, preferably about 90 durometers on the A scale. Sleeve 30 is further dimensioned so that its inner surface is slightly smaller than the outer surface of the mandrel. To seat the sleeve on the mandrel, one simply stretches the sleeve over the mandrel. This stretching of the sleeve increases friction between the sleeve and the mandrel which prevents the sleeve from slipping on the mandrel when the tool is used to clean a socket. While not shown, the surface of the mandrel could also be textured to increase friction between the sleeve and the mandrel and thereby further reduce the likelihood of slippage between the sleeve and mandrel. The sleeve could also be glued to the mandrel with an adhesive such as a cyanoacrylic-type adhesive.

Tool 10 also includes a novel retention knob assembly 40. Assembly 40 has a knob 42 at its free end which is receivably held/gripped in a conventional retention device (not shown) which holds the tool in place in a socket of the machine to be cleaned by the tool. Assembly 40 also has a hollow cylindrical shaft portion 44 which is received in a cylindrical bore 46 of mandrel 18. Assembly 40 is rotatively secured to mandrel 18 by a bolt means 48 which extends through the hollow of shaft 44. Bolt means 48 includes ball-bearings 50 and bearing spacers 52 (and a wide spacer 53) which enable shaft 44 to rotate relative to mandrel 18. Accordingly, it will be understood that retention knob assembly 42 can be held in place for example, in a retention device (not shown) while mandrel 18 is rotated to clean a socket.

FIG. 4 illustrates that retention knob assembly 40 also includes a coil spring 60 or spring means which is located about the central shaft section (not numbered) of bolt means 48. The spring is held in compression by impacting against the head 54 of the bolt means and a ledge 56 of shaft 44. Those skilled in the art will appreciate that the pressure of the wiper blades against the surface of the socket to be cleaned by the tool can be increased (this pressure is referred to as squeegee pressure herein) by threading bolt means 48 further into mandrel 18 so that spring 60 is further compressed which will increase squeegee pressure on the surface of the socket to be cleaned when the tool is held in a socket by a conventional retention device holding knob 42.

Squeegee pressure can also be increased by inserting additional bearing spacers at either end of spring 60 which will further compress spring 60. FIG. 4 also illustrates that squeegee pressure is set or maintained at a desired level by threading a set screw 62 tightly against a flat portion 64 of the threaded portion of bolt means 48.

Tool 10 may also be provided with a cover 70 shown in dotted lines in FIG. 1 covering handle 12. Cover 70 would be suitable for use in any application where handle 12 is likely to be exposed to dripping oil and other contaminants which might damage the handle or the DC motor located in the handle.

The invention has been described in detail with reference to a particular embodiment thereof, but it will be understood that various other modifications can be effected within the spirit and scope of this invention.

I claim:

1. A socket cleaning tool for cleaning frustoconically shaped sockets, said tool comprising:
    a mandrel;
    a generally hollow elastomeric sleeve for seating on said mandrel, said sleeve defining an inner surface for seatingly receiving said mandrel and an outer surface defining a plurality of wiper strips which extend substantially the length of said sleeve and which terminate at edges, said edges defining an imaginary frustoconical surface complementing that of a frustoconically-shaped socket so that said edges contact the surface of the socket; and
    grip facilitating means for facilitating gripping of said tool so that said mandrel and sleeve seated thereon can be rotated in unison in the socket to enable said wiper strips to wipe and clean the surface of the socket.

2. A socket cleaning tool as claimed in claim 1 wherein said inner surface of said sleeve is slightly smaller than the outer surface of said mandrel so that said sleeve is seated on said mandrel by stretching said sleeve over said mandrel, the stretching of which increases friction between said sleeve and said mandrel to prevent said sleeve from slipping on said mandrel when the tool is used to clean a socket.

3. A socket cleaning tool as claimed in claim 1 wherein the surface of the mandrel is textured to increase friction between said sleeve and said mandrel.

4. A socket cleaning tool as claimed in claim 1 further comprising adhesive located between said sleeve and said mandrel for adhesively securing said sleeve to said mandrel to prevent said sleeve from slipping on said mandrel when the tool is used to clean a socket.

5. A socket cleaning tool as claimed in claim 4 wherein said adhesive is a cyanoacrylic type adhesive.

6. A socket cleaning tool as claimed in claim 1 wherein said grip facilitating means includes an elongated base member which is rotatably attached to said mandrel so that said mandrel is capable of rotating about the longitudinal axis of said elongate member, said elongate member further including a self-contained power means for rotatively driving said mandrel.

7. A socket cleaning tool as claimed in claim 6 wherein said mandrel defines a cylindrical chamber for receiving a central shaft which is axially aligned with the longitudinal axis of said elongate member and driven by said self-contained power means.

8. A socket cleaning tool as claimed in claim 6 further comprising grip facilitating means including a disc-shaped flange member which extends from a central portion of said elongate base member and is coaxially aligned therewith, said flange member defining a V-shaped groove about its periphery for receiving the gripping elements of an automated tool changing mechanism.

9. A socket cleaning tool as claimed in claim 1 further comprising a retention knob assembly projecting outwardly from said mandrel and being axially aligned therewith, said retention device assembly having a knob at its free end for receipt in a retention member to hold the tool in place in a socket to be cleaned by said tool, said retention knob assembly further including adjustable spring means for adjusting the squeegee pressure of the wiper strips against surface of the socket, said retention knob assembly further including rotatable attaching means for rotatively attaching said retention knob assembly to said mandrel so that said mandrel is capable of being rotated relative to said retention knob assembly.

10. A socket cleaning tool as claimed in claim 1 wherein said sleeve and said wiper strips are integral.

11. A socket cleaning tool as claimed in claim 1 wherein said sleeve is provided with an odd number of wiper strips.

12. A socket cleaning tool as claimed in claim 1 wherein said sleeve is provided with five wiper strips.

13. A socket cleaning tool as claimed in claim 1 wherein said grip facilitating means includes a handle attached to said mandrel, said handle facilitating hand gripping of said tool by an individual.

14. A socket cleaning tool as claimed in claim 13 further comprising a cover for said handle.

15. A socket cleaning tool as claimed in claim 1 wherein said mandrel and said sleeve are frustoconically-shaped.

* * * * *